United States Patent [19]
Kaipainen

[11] Patent Number: 5,908,550
[45] Date of Patent: Jun. 1, 1999

[54] WATER RECLAMATION SYSTEM FOR A VEHICLE WASH SYSTEM

[75] Inventor: Pasi Kaipainen, Ann Arbor, Mich.

[73] Assignee: InterClean Equipment, Inc., Ann Arbor, Mich.

[21] Appl. No.: 08/953,697

[22] Filed: Oct. 17, 1997

[51] Int. Cl.⁶ .............................. C02F 9/00; B01D 36/04; B04C 9/00; B60S 3/00

[52] U.S. Cl. .................. 210/167; 210/195.1; 210/195.3; 210/196; 210/220; 210/411; 210/259; 210/295; 210/304; 210/512.1; 210/416.1

[58] Field of Search .................................. 210/167, 259, 210/295, 416.1, 196, 195.1, 195.3, 304, 220, 411, 512.1, 532.1; 134/111, 123

[56] References Cited

U.S. PATENT DOCUMENTS

| | | |
|---|---|---|
| 3,384,239 | 5/1968 | Berardi . |
| 3,616,917 | 11/1971 | Hellwege . |
| 3,774,625 | 11/1973 | Wiltrout . |
| 3,810,544 | 5/1974 | Armstrong . |
| 3,923,658 | 12/1975 | Lancaster . |
| 4,104,164 | 8/1978 | Chelton . |
| 4,168,231 | 9/1979 | Allen . |
| 4,652,368 | 3/1987 | Ennis . |
| 4,859,329 | 8/1989 | Fink . |
| 5,498,329 | 3/1996 | Lamminen et al. . |
| 5,514,266 | 5/1996 | O'Brien . |
| 5,556,535 | 9/1996 | Van Der Est . |

FOREIGN PATENT DOCUMENTS

| | | |
|---|---|---|
| 2626697 | 12/1977 | Germany . |

*Primary Examiner*—Thomas M. Lithgow
*Attorney, Agent, or Firm*—Harness, Dickey & Pierce P.L.C.

[57] ABSTRACT

A water reclamation system for a vehicle wash system that provides water that is purified to enable reclaimed water to be used in a positive displacement pump. The reclamation system provides for continuous flow of water through the vehicle wash settling pit with an aerator to oxygenate the water and prevent odors typically produced by stagnant water from wash system settling pits. The water reclamation system is operable to clean the carwash system settling pit except for the primary pit in which the debris accumulated from the secondary settling pit is deposited.

20 Claims, 3 Drawing Sheets

WATER RECLAMATION SYSTEM FOR A VEHICLE WASH SYSTEM

BACKGROUND AND SUMMARY OF THE INVENTION

The present invention relates to a water reclamation system for a vehicle wash system and in particular to a water reclamation system that removes particulate matter from the water sufficiently to enable the water to be used in a high pressure vehicle wash that cleans the vehicle primarily or solely by spray impact of water against the vehicle. Such a wash system typically requires a positive displacement pump which is more sensitive to particulate matter in the water than other types of pumps.

Many vehicle wash systems employ a water reclamation process whereby much, if not most of the water used in the vehicle wash is recycled for use again. This reduces the overall water consumption by the vehicle wash as well as the quantity of water discharged from the vehicle wash. Many vehicle wash systems use water in combination with brushes and/or soft cloths or other devices to remove dirt and debris from the vehicle surface. Other vehicle wash systems utilize a high pressure water spray without any brushes, soft cloths or other devices contacting the surface of the car. To provide an effective car wash without the use of brushes, it is necessary to have a higher water impact on the vehicle surface as compared to vehicle wash systems utilizing brushes, etc. To produce the necessary high pressure, a positive displacement pump or a multi-stage centrifugal pump is typically required. These pumps are more sensitive to particulates in the water. As a result, a high pressure wash, especially utilizing a positive displacement pump, requires a higher degree of water purity than in a low pressure wash.

Accordingly, it is one object of the present invention to provide a water reclamation system for use in a vehicle wash system to provide high purity recycled water to the vehicle wash system.

Many low pressure soft cloth vehicle wash systems are converting to high pressure spray systems and thus require a better water reclamation and filtering system than previously used. It is another object of the invention to provide a reclamation system that is suitable for easy installation into an existing vehicle wash establishment as it converts to a high pressure vehicle wash.

In a vehicle wash system with water recycling, since large quantities of water remain within the vehicle wash system, it is necessary to control or eliminate odors produced by bacteria in the water. It is a further object of the present invention to provide a water reclamation system that controls odor from the water within the wash system.

Typical water reclamation systems utilize a plurality of particulate separators or filters to clean the water. Solid particles that have been separated from the water are returned from the separators to the wash system settling pit or above ground tanks. Due to the distance which these solids often must travel to reach the settling pit, it is necessary to have an adequately large vertical drop from the particulate separators to the settling pit to enable satisfactory gravity flow. The present invention utilizes a pump for pumping the particulate matter from the solid separators to the settling pit thereby eliminating the requirement for a large vertical drop from the separators to the settling pit.

In addition, the same pump can also be used to draw water and debris from the bottom of a secondary or tertiary or cleanest settling pit and pump it back into the primary settling pit. This creates a continuous circulation of water through the settling pits regardless of the use of the vehicle wash system. In other words, during periods of non-use, water circulation can be maintained through the settling pits. With the addition of an aerator in the circulation path, proper oxygen levels in the water can be maintained to prevent odors from being produced. Since the water in the settling pits is oxygenated and this same water is drawn from the pits for reuse in the wash system, oxygenate water is present throughout the wash system.

The reclamation system includes a filter for water drawn from the settling pit of the wash system. The filter includes a housing with a filter element contained therein to divide the interior of the housing into first and second portions. The water inlet from the settling pit is directed into the first portion of the housing interior, i.e. dirty side of the filter, while a clean water outlet is in the second portion, i.e. clean side of the filter, whereby water must flow through the filter element before reaching the clean water outlet. Preferably, the filter element is cylindrical, and has slot openings which extend in a circumferential direction. The dirty water inlet is arranged to produce a circumferential or spiral water flow within the housing over the surface of the filter element to wash and clean debris from the filter element. A solids purge outlet at the bottom of the filter housing enables the solids that have been filtered from the water to be removed from the filter housing. The purged debris is pumped to the primary settling pit of the vehicle wash.

The water reclamation system further utilizes one or two solids separators. In a preferred embodiment, two separators are used. The first separator is preferably a cyclone separator while the second separator is preferably a clarifying tank. Both separators utilize centrifugal forces and the gravity to separate solids from the water. Other types of separators can also be used.

In a preferred embodiment of the invention, only three pumps are required in the entire system. A first pump, a sump pump, is used to pump water through the filter, through the first solids separator and into the second solids separator or holding tank. A second pump, which may be a high pressure or other type of pump, is utilized to provide cleaned water from the holding tank to the vehicle wash system. A third pump, a purge pump, is used to remove solids from the separators and the filters. The purge pump is also used to draw water from one end of the settling pits and circulate the water to the other end of the settling pits while doing so, the water is oxygenated to control odor. By utilizing a purge pump to clean debris from the separators, a large vertical drop is no longer necessary from the separators to the settling pit, thereby enabling the overall height of the water reclamation system to be reduced. Preferably, the height of the system is such that a module containing the pumps, cyclone separator, clarifier tank and related equipment can be pre-mounted to a frame and fit within a standard size transport truck. The entire package is then suitable for placement on the floor of a vehicle wash system without any alterations required. If the water reclamation system is being used to upgrade an existing carwash facility that already has a suitable pump for the vehicle wash system, the second pump outlined above may not be required.

It is an advantage of the present invention that the third pump, the purge pump can be used to perform all of the following functions: 1) remove solids from the secondary settling pit and deposit them elsewhere; 2) clean the solids from the filter; 3) clean solids from the cyclone separator, other separators and clarifying tanks; and 4) maintain a water circulation through the settling pits and provide aeration of the water.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
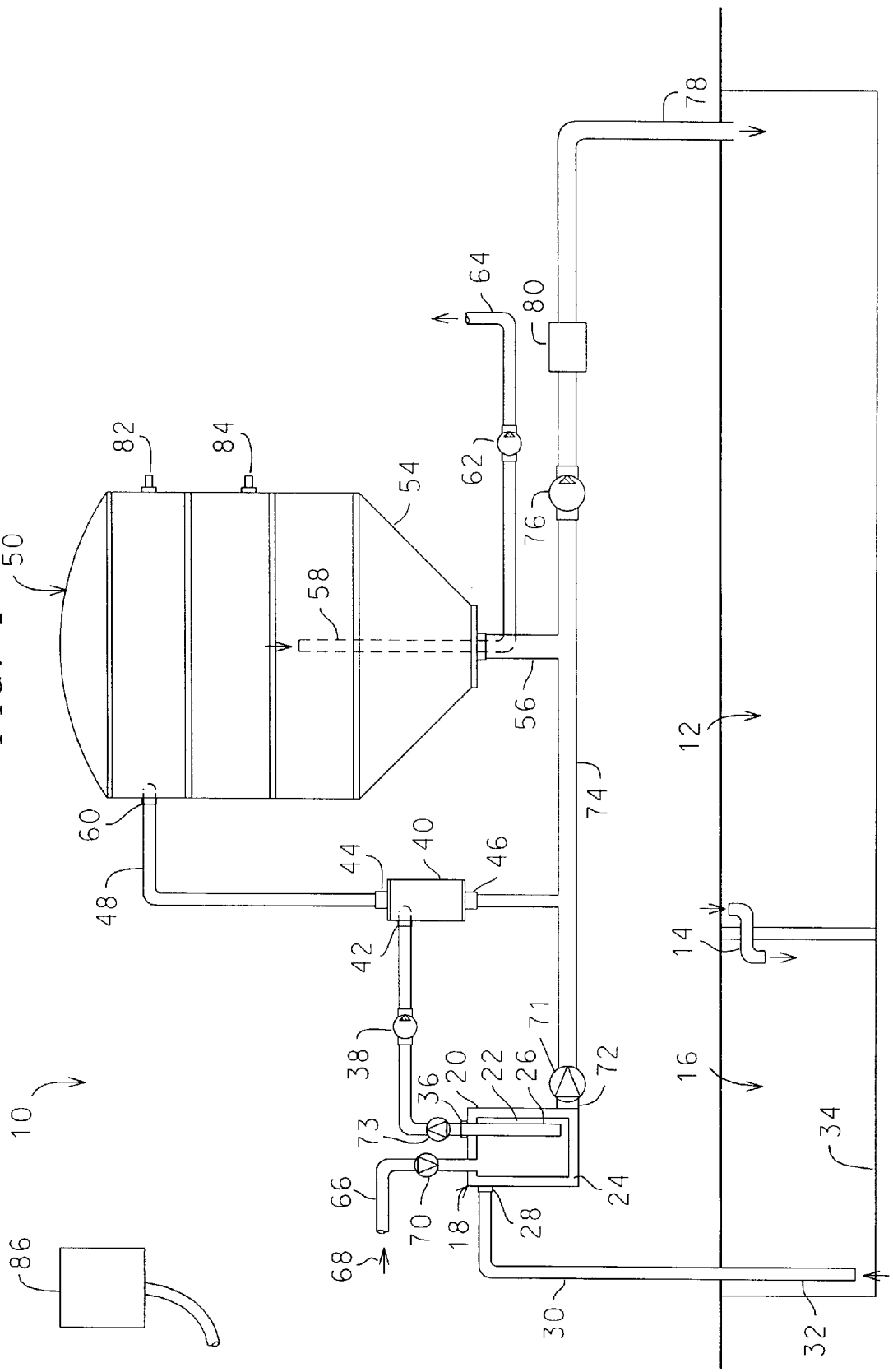
FIG. 1 is a schematic diagram illustrating the water reclamation system in connection with the settling pits of a vehicle wash system.

The water reclamation system of the present invention for use with a vehicle wash system is shown in FIG. 1 and designated generally at 10. The vehicle wash system includes a primary settling pit 12 that is at the base of a sloped bottom floor for receiving water that has been used in cleaning a vehicle and has collected at the base of the vehicle wash system. This water contains the solid debris removed from the surface of the vehicle. In the primary settling pit 12, a portion of the particulate debris in the water is allowed to settle in the base of the pit. Relatively clean water flows from the top of the pit through a transfer tube 14 into one or more secondary settling pits 16, only one of which is shown. Typical vehicle wash systems have two or more settling pits arranged in series with the relatively cleaner water flowing from each pit into the next successive settling pit. The invention is described in the context of a vehicle wash having two settling pits. Any number of pits, including only one, may be used as will be discussed below.

The reclamation system includes a filter 18 having a housing 20 with a screen type filter element 22 in the interior of the housing. The filter element divides the interior of the housing into a first portion 24 and a second portion 26. An inlet 28 receives dirty water into the first portion, or the dirty water side of the filter, through an inlet conduit 30. The inlet conduit has a take up end 32 which is position near the bottom 34 of the secondary settling pit.

The filter further has a clean water outlet 36 coupled to the second portion, or clean water side of the filter through which filtered water is drawn from the filter. A pump 38, referred to as a sump pump, is coupled to the water outlet 36 and draws water from the settling pit 16 through the filter 18. The sump pump 38 pumps water into a first solid separator 40 for further removal of solid particles from the reclaimed water. The separator 40 is preferably a cyclone centrifugal separator such as a Lakos separator available from the Claude Laval Corporation. The first solid separator has an inlet 42 for receiving water to be cleaned and a clean water outlet 44 through which water that has been cleaned by the separator is discharged. The separator 40 further includes a purge outlet 46 through which the separated solids, as well as some water, are purged from the separator.

The relatively clean water from the separator 40 is pumped by the pump 38 through a conduit 48 into a storage tank 50. The tank 50 is preferably a clarifying tank which also removes solid particles from the water. The clarifier tank is described in more detail in U.S. Pat. No. 5,498,329, incorporated herein by reference. The clarifying tank has a conical bottom 54 which leads to a purge outlet 56. A clean water discharge pipe 58 extends upwardly into the center of the tank. The tank 50 has an inlet 60 which is positioned along the side at the upper end of the tank 50 to create a circumferential spiral flow of water in the tank. As a result, solids are forced outwardly toward the outside of the tank where they can settle by gravity into the purge outlet 56. The relatively cleaner water is found at the center of the tank where it is drawn off by the clean water discharge pipe 58. The clean water is drawn off by a high pressure or other pump 62 that supplies the clean water through a conduit 64 to the vehicle wash system where it is used to wash vehicles in a known manner.

With reference again to the filter 18, the filter has an inlet 66 for receiving a pressurized medium as shown by the arrow 68 to the second portion or clean portion of the filter. A pressurized matter, preferably pressurized air, is introduced into the clean side of the filter for the purpose of back washing the filter to remove solid particles that have been collected in the filter element 22. The backwash of the filter is automatically activated by a reduced flow of water through the sump pump 38 or by a timer or by other means.

The filter further has a purge outlet 72 in the dirty side of the filter through which debris removed from the filter element during the backwash is removed from the housing 20. Furthermore, the outlet 72 in the filter dirty side, is in fluid communication with the inlet conduit 30, allowing water to flow from the pit 16 through the filter housing to the purge outlet 72 without flowing through the filter element. The filter purge outlet 72, the first separator purge outlet 46 and the second separator purge outlet 56 are all coupled to a purge conduit 74 connecting to the inlet of a purge pump 76. The outlet from the purge pump 76 is directed through a conduit 78 back to the upstream end of the settling pit 12 or to a settling tank located elsewhere.

An aerator 80 can be provided to aerate the purged water that is pumped by the pump 76. In FIG. 1, the aerator is shown after the pump 76. However, the aerator can be placed before the pump 76 as well. Operation of the pump 76 draws water through the filter housing but not through the filter element 22 and back into the primary settling pit 12. By doing so, continuous circulation of water through the settling pits 12 and 16 can occur. The recirculated water is oxygenated to prevent stagnation and the formation of odors. The pump 76 is operated to maintain this flow during use of the wash system as well as during periods of non-use. Air can be drawn into the system through the solids separator 40. An air inlet vent is a typical feature of cyclone separators allowing air to enter the separator. If sufficient air can be drawn in, a separate aerator 80 may not be needed to oxygenate the water.

The second solids separator includes level sensors 82 and 84 which sense the level of water within the tank 52. The sensors control the operation of pump 38 to ensure that the water level within the tank 52 remains between the two level sensors. The high pressure pump 62 is operated as demanded to provide high pressure spray for cleaning vehicles in the vehicle wash system. The purge pump 76 can be operated on a timing program or continuously to provide the desired circulation through the settling pits. The pumps can be controlled by separate control devices or by a central controller 86 if desired. The controller 86 can be the vehicle wash system controller as well.

Figure 3:
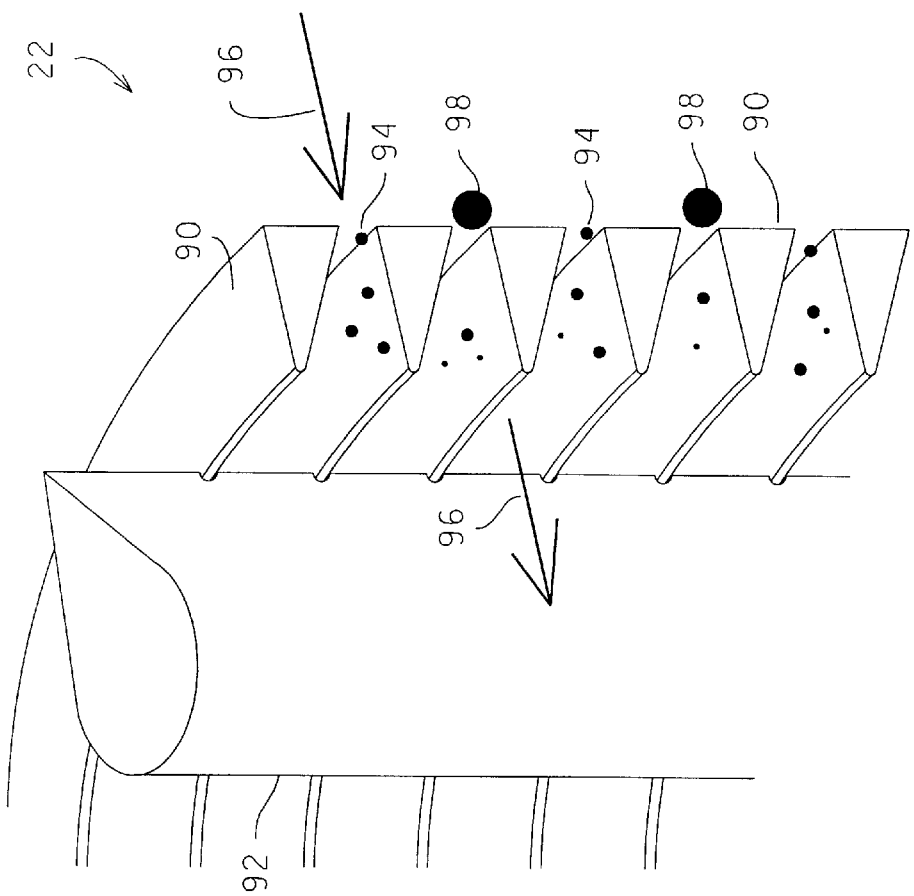
FIG. 3 is a fragmentary sectional view of a preferred filter element.
Figure 2:
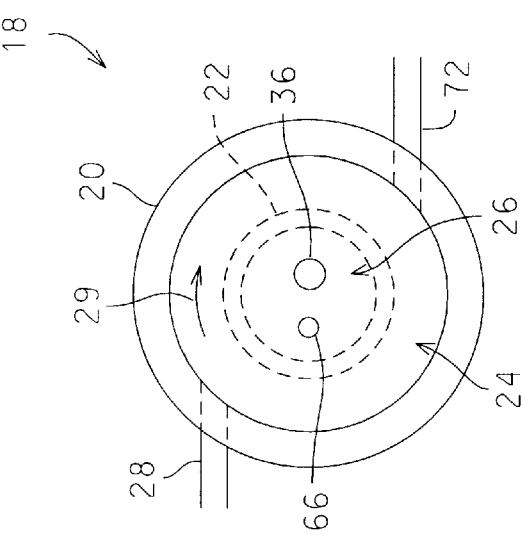
FIG. 2 is a top view of the filter of the water reclamation system of the invention.

With reference to FIGS. 2 and 3, the filter 18 is shown in greater detail. The filter includes a housing 20 with a filter element 22 disposed therein. The water inlet 28 provides water into the interior of the housing into a first portion 24 which contains dirty, unfiltered water, and thus is referred to as the dirty side of the filter. The filter element 22 separates the interior of the housing into a second portion 26 which contains water that is passed through the filter element 22 and is thus referred to as the clean side of the filter. Preferably, the filter housing and element are cylindrical. The inlet 28 is positioned near the upper end of the housing 20 and is oriented tangentially to the housing to create a circumferential spiral flow of water around the filter element 22, as shown by arrow 29 to assist in cleaning particles that have accumulated in the pores of the filter element.

In the preferred embodiment, the filter element 22 is a wire screen having a plurality of wires 90 that are V-shaped in cross-section as shown in FIG. 3. These wires are supported on a plurality of frame members 92, only one of which are shown. The V-shaped wires are oriented with one another to produce narrow slot openings 94 through which water passes as shown by the arrows 96. The size of the slot openings determines the size of particles 98 which are filtered or separated from water by the filter element 22. As described earlier, the filter is back washed by introducing a pressurized medium such as air into the filter element through the conduit 66. This air flows opposite the arrows 96 to remove the particles 98 that have accumulated in the slot openings of the filter element. By producing a spiral flow of water over the filter surface as described above, particles that accumulate in the filter element can be washed from the surface of the filter thus increasing the length of time between backwashings of the filter element. The slot openings 94 are arranged circumferentially about the filter element, in the direction of the spiral flow of water over the filter element.

The filter element 22 can be attached to the filter housing bottom wall 100 and the housing top wall 102 to provide a seal between the dirty and clean sides of the filter. Alteratively, the filter element can be spaced from the top and bottom walls of the housing and have its own lower and upper walls 104 and 106 to divide the housing interior into the dirty and clean portions.

The backwash conduit 66, and the purge conduit 74 have check valves 70 and 71 at the filter to prevent drawing fluid into the filter housing through these conduits by operation of the sump pump 38. Likewise, a check valve 73 at the filter clean water outlet prevents back flow of water into the filter operation by the purge pump 76. As a result, the pump suction draws water only through the conduit 30 from the settling pit 16. As shown in FIG. 1, the filter 18 is located out of the settling pit 16. Alternatively, the filter element can be located in the settling pit 16 if the settling pit is large enough to accommodate the filter. The ability to position the filter out of the pit 16 is particularly important in retrofitting existing wash systems with the water reclamation system of the present invention. Placing the filter in the pit will reduce settling space and time by occupying part of the pit volume. Where the pit 16 has already been constructed, it may not be large enough to accommodate the filter and have the required water volume.

By locating the filter inlet 32 near the bottom of the settling pit 16, debris is constantly removed from the settling pit 16 and returned to the pit 12. As a result, the pit 16 is continuously cleaned, eliminating the need for periodically draining the pit to remove debris. Most of the debris will be accumulated in the settling pit 12 leaving only one pit which must be drained for periodic cleaning.

Figure 4:
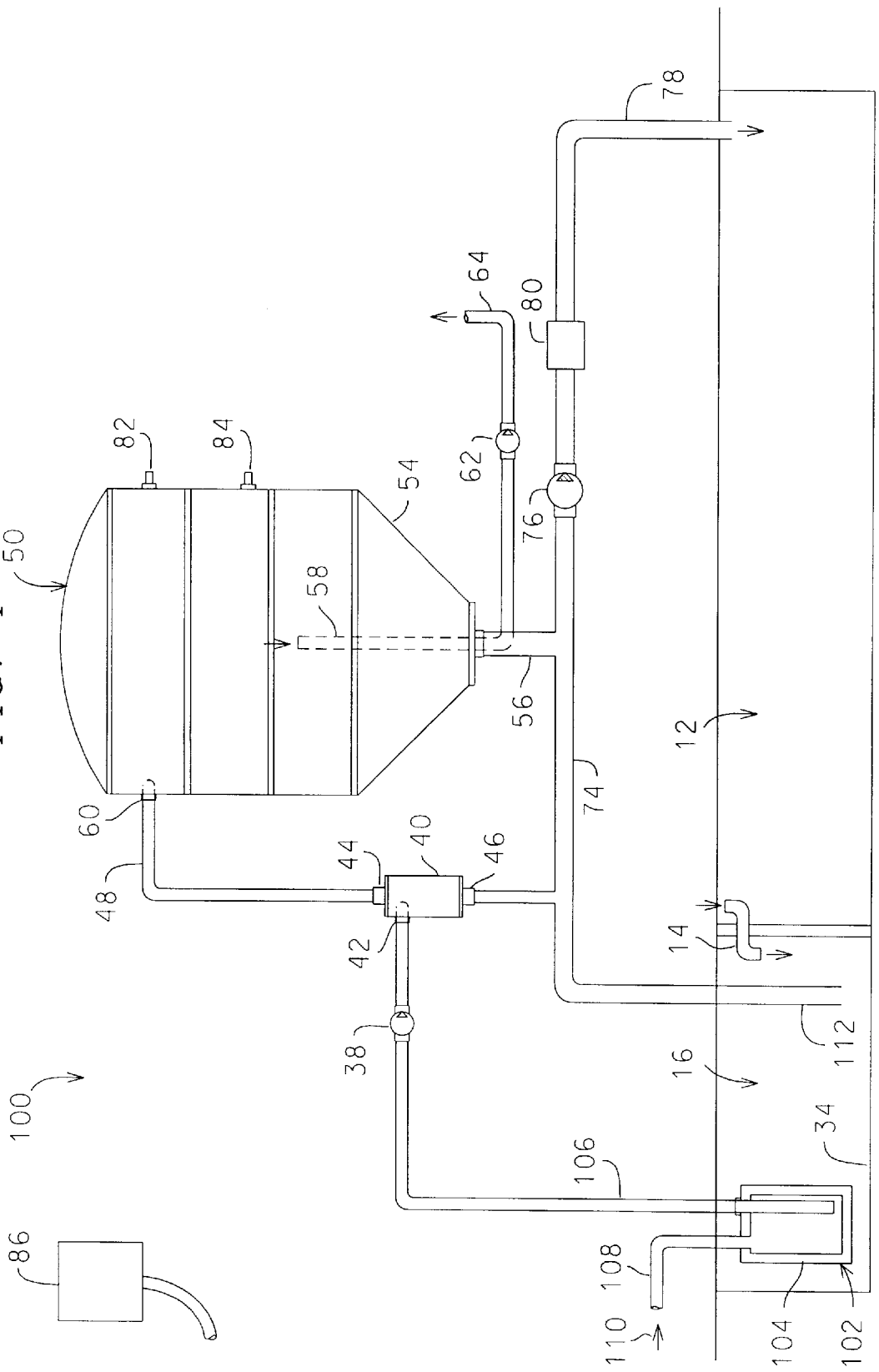
FIG. 4 is a schematic diagram similar to FIG. 1 illustrating an alternative embodiment of the water reclamation system.

An alternative embodiment of the invention is shown in FIG. 4. The water reclamation system 100 contains many common elements with the reclamation system 100 shown in FIG. 1. Common elements are designated with the same reference numerals. In the system 100, a filter 102 is placed in the pit 16. The filter 102 includes a filter element 104 that is not contained within a housing. The filter element 104 is a screen filter like the filter element 22 shown in FIGS. 1 and 3. The water is drawn from the filter through a pipe 106 by the pump 38 which pumps the water into the first separator 40 and into the tank 50. The filter is periodically back washed by the introduction of a pressurized medium in the conduit 108 as shown by the arrow 110.

The purge conduit 74 has an inlet 112 in the settling pit 16 which draws water and debris from the settling pit and pumps it to the primary settling pit 12. The purge pump 76 is used for this purpose and also to purge solids from the separator 40 and the tank 50 as described above. The arrangement shown in FIG. 4 is useful when the settling pit 16 is large enough to accommodate the filter and still maintain sufficient volume for settling of solids from the water contained therein. The one pump 76 is still used to aerate and circulate water through the settling pits, remove debris from the secondary settling pit 16 and purge solid debris from the separators as described above.

While the invention has been described for use with a vehicle wash system having settling pits, it is recognized that tanks and their holding vessels may be used in place of a below ground pit. In the claims that follow, the term "collecting vessel" is used to mean settling pit or pits, tank(s) or any other device for collecting water that has been used in washing vehicles.

It is to be understood that the invention is not limited to the exact construction illustrated and described above, but that various changes and modifications may be made without departing from the spirit and scope of the invention as defined in the following claims.

I claim:

1. A water reclamation system for a vehicle wash system in which the wash system has a collecting vessel for collecting and holding water and solid debris from a washed vehicle, the reclamation system comprising:

a first pump for pumping water from the vehicle wash system collecting vessel;

filter means for removing a portion of the solid debris from the water pumped from the collecting vessel by the first pump;

solids separator means for further removing solid debris from water that has been pumped through the filter, the solids separator means having a water inlet in communication with the filter for receiving water from the filter, a water outlet for discharging water that has been cleaned therein and a purge outlet for discharging solid debris that have been separated from the water;

a holding vessel for holding water that has passed through the solids separator means;

a second pump having an inlet in communication with the purge outlet of the solids separator means for receiving water and solid debris therefrom and an outlet in communication with the vehicle wash system collecting vessel at an end thereof for delivering water and solid debris to the vehicle wash system collecting vessel whereby the solid debris accumulates in the vehicle wash system collecting vessel, the inlet of the second pump further being in communication with the vehicle wash system collecting vessel at another end thereof whereby water is circulated through the vehicle wash system collecting vessel; and means for aerating water pumped by the second pump whereby water in the vehicle wash system collecting vessel and water pumped from the vehicle wash system collecting vessel into the holding vessel is oxygenated.

2. The water reclamation system of claim 1 further comprising a third pump having an inlet in communication with the holding vessel for pumping water to the vehicle wash system.

3. The water reclamation system of claim 2 wherein the third pump is a positive displacement pump.

4. The water reclamation system of claim 1 wherein the second pump operates to produce a predetermined circulation of water through the vehicle wash system collecting vessel.

5. The water reclamation system of claim 1 wherein the first pump is operable to move water from the vehicle wash system collecting vessel, through the filter and solids separator means and into the holding vessel.

6. The water reclamation system of claim 1 wherein the means for aerating is an aerator through which water that is pumped by the second pump flows.

7. The water reclamation system of claim 1 wherein the means for aerating is an air inlet in the solids separator means.

8. The water reclamation system of claim 1 wherein the solids separator means is a cyclone separator.

9. The water reclamation system of claim 8 wherein the means for aerating is an air inlet into the cyclone separator whereby air is draw through the cyclone separator purge outlet by the second pump.

10. The water reclamation system of claim 1 wherein the holding vessel is a clarifying tank which further removes solid debris from the water therein and which has a purge outlet for discharging solid debris that have been separated from the water in the clarifying tank, the inlet of the second pump being in communication with the purge outlet of the clarifying tank for receiving water and solid debris therefrom for delivering the water and solid debris to the vehicle wash system collecting vessel.

11. The water reclamation system of claim 1 wherein the filter is disposed within the vehicle wash system collecting vessel.

12. The water reclamation system of claim 1 wherein the filter is a screen filter.

13. The water reclamation system of claim 1 wherein the filter is a V-shaped wire screen with slot shaped openings for the water to flow through.

14. The water reclamation system of claim 1 wherein the filter has a housing defining an interior and a filter element therein dividing the housing interior into a dirty water portion and a clean water portion, the filter housing having a dirty water inlet into the dirty water portion for receiving dirty water from the vehicle wash system collecting vessel, a clean water outlet from the clean water portion for water that has passed through the filter element and a purge water outlet for removing water and solid debris from the dirty portion of the filter.

15. The water reclamation system of claim 14 wherein the filter element has elongated slot openings for water to flow therethrough with the slot openings arranged generally parallel to one another and wherein the dirty water inlet is arranged to produce water flow across the slot openings in the longitudinal direction of the slot openings whereby the flow of water over the openings acts to wash solid debris from the slot openings.

16. The water reclamation system of claim 15 wherein the filter housing and filter element are cylindrical with the slot openings in the filter element extending longitudinally in a circumferential direction and the inlet is arranged to produce a circumferential flow of water over the filter element.

17. The water reclamation system of claim 15 wherein the inlet of the second pump is in communication with the purge outlet of the filter to remove solid debris from the dirty side of the filter and to also draw water and solid debris from the vehicle wash system collecting vessel through the filter dirty water inlet.

18. The water reclamation system of claim 14 wherein the filter is disposed outside of the vehicle wash system collecting vessel.

19. The water reclamation system of claim 1 further comprising means for back washing the filter to remove solid debris collected in the filter.

20. The water reclamation system of claim 1 wherein the filter element is a screen of V-shaped wire.

* * * * *